(12) United States Patent
Sipe et al.

(10) Patent No.: US 10,201,904 B2
(45) Date of Patent: Feb. 12, 2019

(54) SYNCHRONIZING AND BRAKING MECHANISM FOR GRIPPER JAWS

(71) Applicant: PHD, Inc., Fort Wayne, IN (US)

(72) Inventors: Andrew J. Sipe, Fort Wayne, IN (US); Matthew R. Williams, Fort Wayne, IN (US)

(73) Assignee: PHD, Inc., Fort Wayne, IN (US)

( * ) Notice: Subject to any disclaimer, the term of this patent is extended or adjusted under 35 U.S.C. 154(b) by 0 days.

(21) Appl. No.: 15/417,678

(22) Filed: Jan. 27, 2017

(65) Prior Publication Data
US 2017/0217026 A1    Aug. 3, 2017

Related U.S. Application Data

(60) Provisional application No. 62/287,934, filed on Jan. 28, 2016.

(51) Int. Cl.
| | | |
|---|---|---|
| *B25J 19/00* | (2006.01) | |
| *B25J 15/00* | (2006.01) | |
| *F16D 63/00* | (2006.01) | |
| *B25J 15/08* | (2006.01) | |
| *B25J 15/02* | (2006.01) | |

(52) U.S. Cl.
CPC ....... *B25J 19/0004* (2013.01); *B25J 15/0023* (2013.01); *B25J 15/0286* (2013.01); *B25J 15/083* (2013.01); *F16D 63/008* (2013.01)

(58) Field of Classification Search
CPC .. B25J 15/0028; B25J 15/0293; B25J 15/086; B25J 19/0004; B25J 15/0023; B25J 15/0286; B25J 15/083; F16D 63/008
See application file for complete search history.

(56) References Cited

U.S. PATENT DOCUMENTS

| | | |
|---|---|---|
| 3,990,140 A | 11/1976 | Polacek et al. |
| 4,336,926 A | 6/1982 | Inagaki et al. |
| 4,611,846 A | 9/1986 | Feiber et al. |
| 4,707,013 A | 11/1987 | Vranish et al. |
| 4,858,979 A | 8/1989 | Parma |
| 5,150,937 A | 9/1992 | Yakou |

(Continued)

FOREIGN PATENT DOCUMENTS

JP    2009-148846 A    7/2009

OTHER PUBLICATIONS

Extended European Search Report dated Jun. 19, 2017 for European Patent Application No. 17 15 3427 (10 pages).

*Primary Examiner* — Stephen A Vu
(74) *Attorney, Agent, or Firm* — Taylor IP, P.C.

(57) ABSTRACT

A device for gripping an object that includes a main body having a first and a second endplate, a baseplate, at least one guide rail, and a first jaw and a second jaw, each receiving the at least one guide rail. The device also includes a first pulley assembly and a second pulley assembly respectively attached to the baseplate and a chain loop respectively attached to the first pulley assembly and the second pulley assembly. The chain loop includes a first chain length and a second chain length and a first link and a second link that attaches the first chain length and the second chain length. Each of the first link and second link include at least one dowel pin. The chain loop is attached to the first jaw and the second jaw by the at least one dowel pin of each of the first link and second link.

19 Claims, 5 Drawing Sheets

(56) References Cited

U.S. PATENT DOCUMENTS

| | | | |
|---|---|---|---|
| 5,215,507 A | 6/1993 | Bönig | |
| 5,529,359 A | 6/1996 | Borcea et al. | |
| 5,595,413 A * | 1/1997 | McGeachy | B25J 15/0253 |
| | | | 294/119.1 |
| 6,224,123 B1 * | 5/2001 | Ubele | B25J 15/0253 |
| | | | 294/119.1 |
| 6,547,258 B2 * | 4/2003 | Mandokoro | B25B 1/18 |
| | | | 269/101 |
| 6,598,918 B1 | 7/2003 | Null et al. | |
| 7,490,881 B2 | 2/2009 | Null et al. | |
| 8,894,118 B2 | 11/2014 | Null et al. | |
| 9,022,442 B2 | 5/2015 | Rousseau et al. | |
| 9,266,242 B2 | 2/2016 | Kob et al. | |
| 2006/0180017 A1 * | 8/2006 | Williams | F16D 63/008 |
| | | | 92/88 |
| 2011/0241365 A1 | 10/2011 | Geary et al. | |
| 2014/0331636 A1 | 11/2014 | Keil | |

\* cited by examiner

SYNCHRONIZING AND BRAKING MECHANISM FOR GRIPPER JAWS

CROSS REFERENCE TO RELATED APPLICATIONS

This is a non-provisional application based upon U.S. provisional patent application Ser. No. 62/287,934, entitled "SYNCHRONIZING AND BRAKING MECHANISM FOR GRIPPER JAWS", filed Jan. 28, 2016, which is incorporated herein by reference.

BACKGROUND OF THE INVENTION

1. Field of the Invention

The present invention relates to mechanical grippers, and, more particularly, to the synchronization and braking of jaw tooling for such grippers.

2. Description of the Related Art

Grippers are mechanical devices characterized by one or more jaws that are moved together or apart by motive means such as an electric motor or pneumatic piston. Generally, the jaws of the gripper are attached to tooling that is responsible for transferring the force of the gripper to a workpiece such that the workpiece may then be held, moved, and/or rotated. This tooling may need to grasp workpieces that differ from one another in size, shape, draft, material, mass, etc. It is often desirable for the movements of the jaws to be synchronized together so that the gripped workpiece is always moved to a repeatable position coincident with the middle of the gripper, irrespective of which jaw might contact the surface of the workpiece first. Methods used in prior art to synchronize jaw motion include racks driving a common pinion, as disclosed in U.S. Pat. No. 7,490,881, or pinned linkages, as disclosed in U.S. Pat. No. 6,598,918. However, such methods used in the prior art to synchronize jaw motion result in an undesirable increase in the physical size, weight, and manufacturing cost of the gripper.

The loss of power, and thereby a loss of grip force, is continually a safety concern, irrespective of whether a gripper is powered pneumatically or with an electric motor. If power is lost while the gripper is in operation and gripping a workpiece, the resulting loss of grip force may lead to the possibility of a falling object. To prevent damage to the workpiece, the surroundings, or harm to an operator, a braking or clamping device can be implemented to prevent the jaws of the gripper from moving apart and dropping the workpiece. In the prior art, brakes or clamping mechanisms have been physically located exterior to the envelope of the jaws and base plate of the gripper. Yet, the exterior location creates the undesirable effect of increasing the volume occupied by the gripper.

What is needed in the art is a gripper that is cost effective and provides an augmented synchronization of jaw motion and a reduction of risk in dropping the workpiece in the event of a loss of power or compressed air supply.

SUMMARY OF THE INVENTION

The present invention provides a gripper that improves jaw synchronization with a first and second pulley assembly and chain loop design, and reduces safety concerns by incorporating a brake assembly.

The present invention in one form is direct to a device for gripping an object that includes a main body having a first and a second endplate, a baseplate extending between the first endplate and the second endplate, at least one guide rail extending between the first endplate and the second endplate, and a first jaw and a second jaw, each receiving the at least one guide rail. The device also includes a first pulley assembly and a second pulley assembly respectively attached to the baseplate, and a chain loop respectively attached to the first pulley assembly and the second pulley assembly. The chain loop includes a first chain length and a second chain length, and a first link and a second link that attaches the first chain length and the second chain length. Each of the first link and the second link include at least one dowel pin. The chain loop is attached to the first jaw and the second jaw by the at least one dowel pin of each of the first link and second link.

The present invention in another form is directed to a device for gripping an object that includes a main body having a first and a second endplate, a baseplate extending between the first endplate and the second endplate, at least one guide rail extending between the first endplate and the second endplate, and a first jaw and a second jaw, each receiving the at least one guide rail. The device further includes a brake assembly including a brake and a brake rod, wherein the brake is attached to the brake rod and the brake rod is attached to the second jaw.

The present invention in yet another form is directed to a device for gripping an object that includes a main body having a first and a second endplate, a baseplate extending between the first endplate and the second endplate, at least one guide rail extending between the first endplate and the second endplate, and a first jaw and a second jaw, each receiving the at least one guide rail. The device also includes a first pulley assembly and a second pulley assembly respectively attached to the baseplate, a chain loop respectively attached to the first pulley assembly and the second pulley assembly. The chain loop includes a first chain length and a second chain length and a first link and a second link attaching the first chain length and the second chain length. Each of the first link and the second link include at least one dowel pin. The chain loop is attached to the first jaw and the second jaw by the at least one dowel pin of each of the first link and second link. The device further includes a brake assembly including a brake and a brake rod, wherein the brake is attached to the brake rod, and the brake rod is attached to the second jaw.

An advantage of the present invention is that a smaller profile of a gripper is achieved, thereby reducing the production cost and the weight of the product, and opening a broader spectrum of use in various size or weight restricted operations.

Another advantage of the present invention is the reduction of operation failure, and thereby a reduced risk of damaging a workpiece or causing harm to a user.

Yet another advantage of the present invention is improved synchronization of jaw motion.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DESCRIPTION OF THE INVENTION

Figure 1:
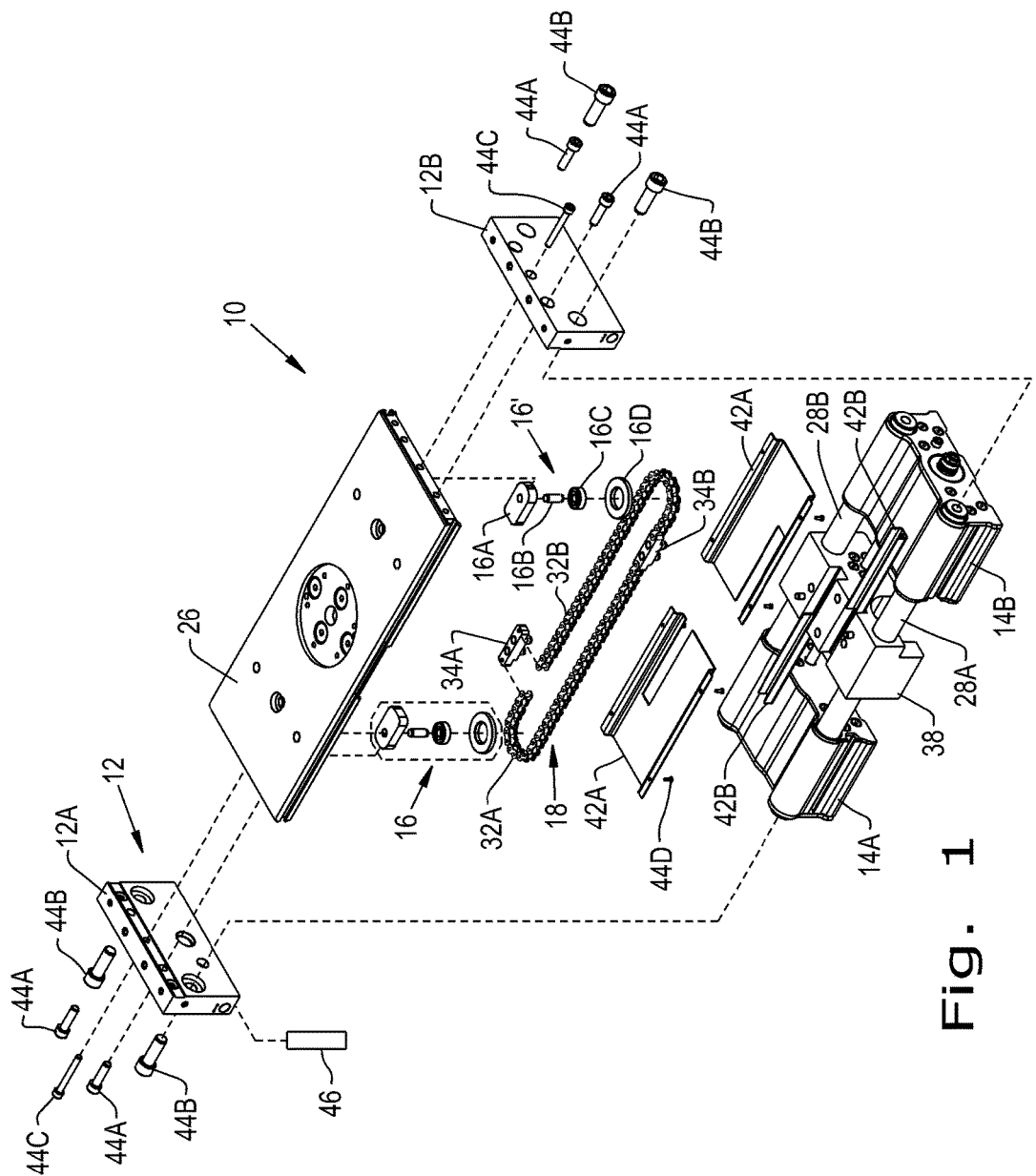
FIG. 1 is an exploded isometric view of the gripper synchronization mechanism according to an embodiment of the present invention.

Referring now to FIGS. 1-7, there is shown an embodiment of a gripper 10 according to the present invention. The gripper 10 includes a main body 12, an actuating circuit, a first and second jaw 14A, 14B, a first and second pulley assembly 16, 16', a chain loop 18, and a brake assembly 20 that has a brake 22 and a brake rod 24.

The main body 12 includes a first and a second endplate 12A, 12B. The endplates 12A and 12B are connected to each other by a baseplate 26 that extends between them. Two fasteners 44A are used to secure each endplate 12A, 12B to the baseplate 26. Two guide rails 28A, 28B extend between the first and second endplates 12A, 12B. Yet, a single guide rail may also be used (not shown). Fasteners 44B can be used to secure the guide rails 28A, 28B (FIG. 1). The main body 12 and the baseplate 26 may be composed of metal, a polymer material, or another desired material.

The actuating circuit includes at least one actuator 46 that is connected to the main body 12. The actuating circuit may be pneumatic or electric. The at least one actuator 46 drives the first and second jaws 14A, 14B. Although the embodiment shown in FIGS. 1-7 specifically applies to a pneumatically driven gripper 10, it is understood that such an embodiment could also be applied to a gripper including an electric motor (not shown). The gripper 10 utilizes a pneumatic circuit similar to that disclosed in U.S. Pat. No. 7,490,881.

The jaws 14A and 14B have holes 30 disposed on a surface. In the present embodiment, the first and second jaws 14A, 14B each receive the two guide rails 28A and 28B through corresponding holes; however, they may receive only one guide rail.

Figure 5:
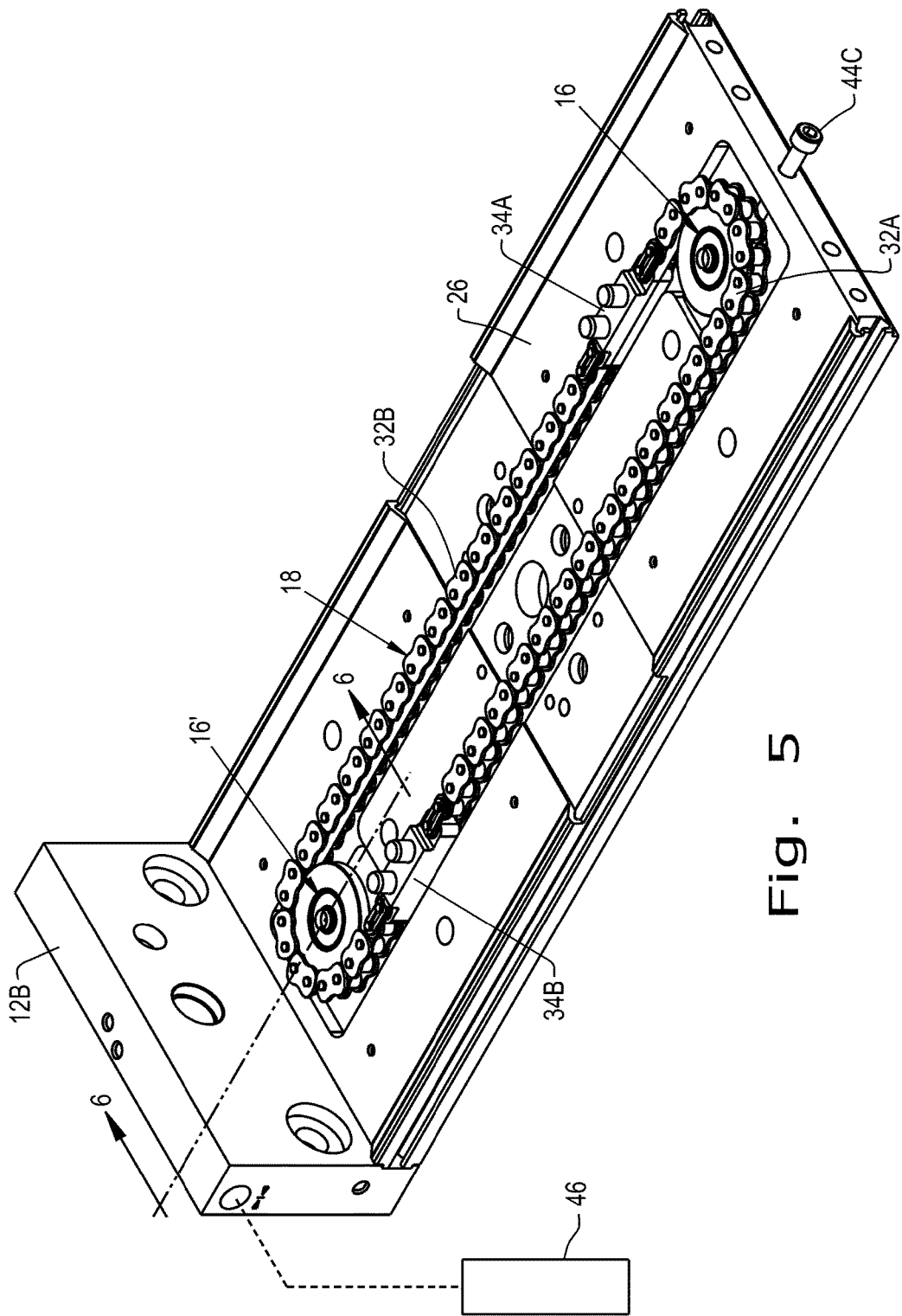
FIG. 5 is a perspective view illustrating the relationship of the chain loop and pulley assemblies.

The first and second pulley assemblies 16, 16' include a pulley base 16A, a pulley dowel pin 16B, a pulley bearing 16C, and a pulley disc 16D. In the present embodiment, there are two identical pulley assemblies 16, 16'. However, one pulley assembly 16 may be used along with a redundant member known in the art. The pulley dowel pin 16B is pressed into the pulley base 16A. The pulley disc 16D is pressed over the pulley bearing 16C, which is then, in turn, pressed onto the pulley dowel pin 16B. Each pulley assembly 16 sits in a respective groove in the baseplate 26 that prevents movement normal to the jaw travel. FIG. 5 shows the positioning of the pulley assemblies 16 and the synchronizing chain loop 18 relative to the baseplate 26.

Figure 2:
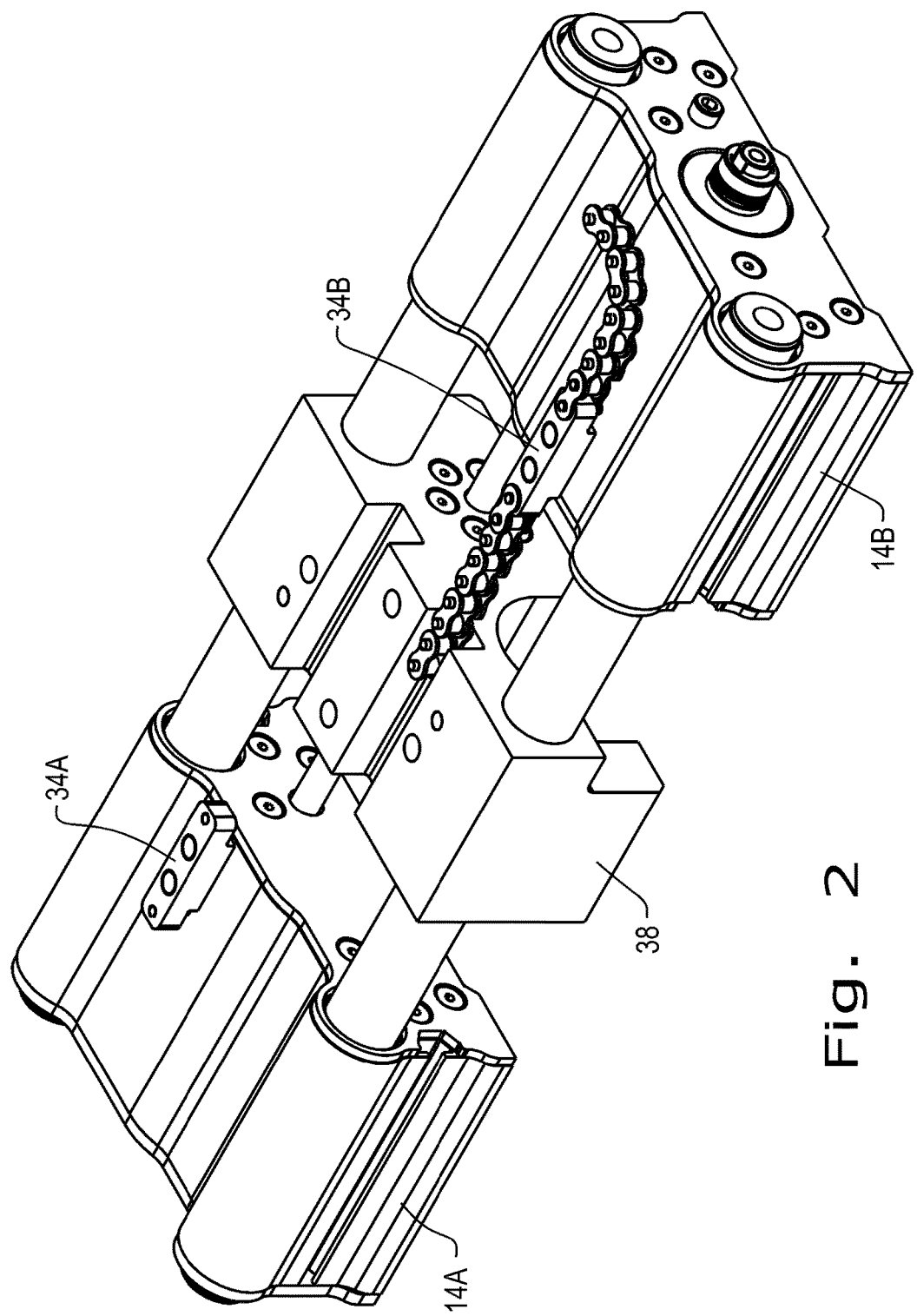
FIG. 2 is a perspective view showing the relationship of the links to the jaws.
Figure 3:
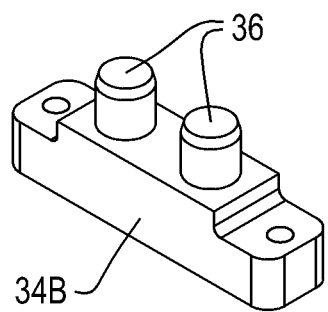
FIG. 3 is a perspective view of a link.

The chain loop 18 is attached to each pulley assembly 16, 16' and includes first and second chain lengths 32A, 32B and first and second links 34A, 34B (FIG. 1). FIG. 2 shows the positioning of the link 34B relative to the jaw 14B. The links 34A and 34B each include at least one dowel pin 36 (FIG. 3). In the present embodiment, each link 34A, 34B has two respective dowel pins 36; however, one or multiple dowel pins 36 may be used. The chain loop 18 is attached to the first and second jaws 14A, 14B by the respective dowel pins 36 of the links 34A, 34B. It is also conceivable for the chain loop 18 to be attached to the first and second jaws 14A, 14B by using a single dowel pin 36 (not shown). The chain loop 18 in the present embodiment is in the form of a metal chain; however, it may be in the form of a polymer chain, cable, rubber belt, or other desirable tensile member known in the art.

Figure 4:
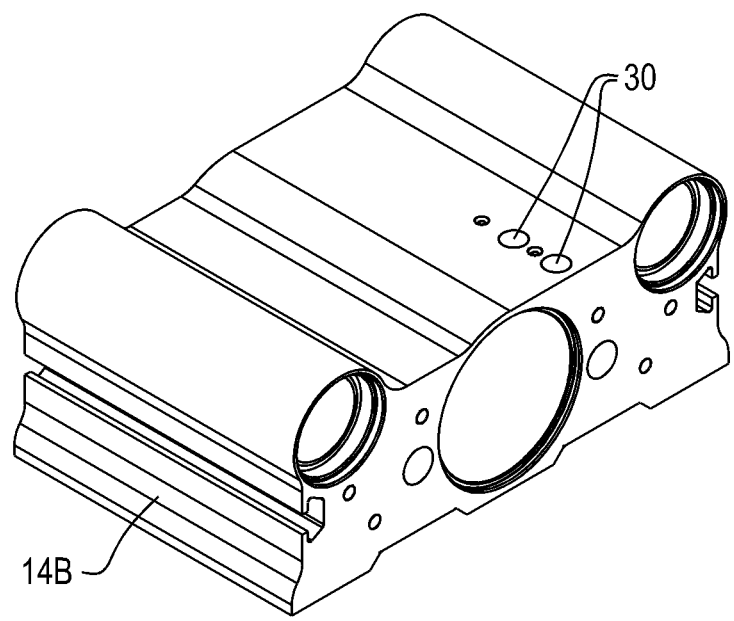
FIG. 4 is a perspective view of a jaw.

The links 34A and 34B serve two critical purposes: connecting the chain loop 18 and attaching the chain loop 18 to the jaws 14A, 14B via dowel pins 36. When pinned to chain lengths 32A and 32B, the links 34A, 34B create the closed loop needed to ensure jaw synchronization. The links 34A and 34B also serve to physically attach the closed loop to the jaws 14A and 14B. FIG. 3 shows the dowel pins 36 in the links 34A, 34B that mate to the corresponding holes 30 in the jaws 14A, 14B as shown in FIG. 4. Due to the closed loop design, the jaws 14A, 14B are forced to move at the same rate whether traveling towards or away from the center plate 38. The center plate 38 is disposed in between the first and second jaws 14A, 14B and it includes respective holes for receiving the guide rails 28A, 28B. The center plate 38 has two grooves to allow the chain lengths 32A, 32B to pass therein.

Figure 6:
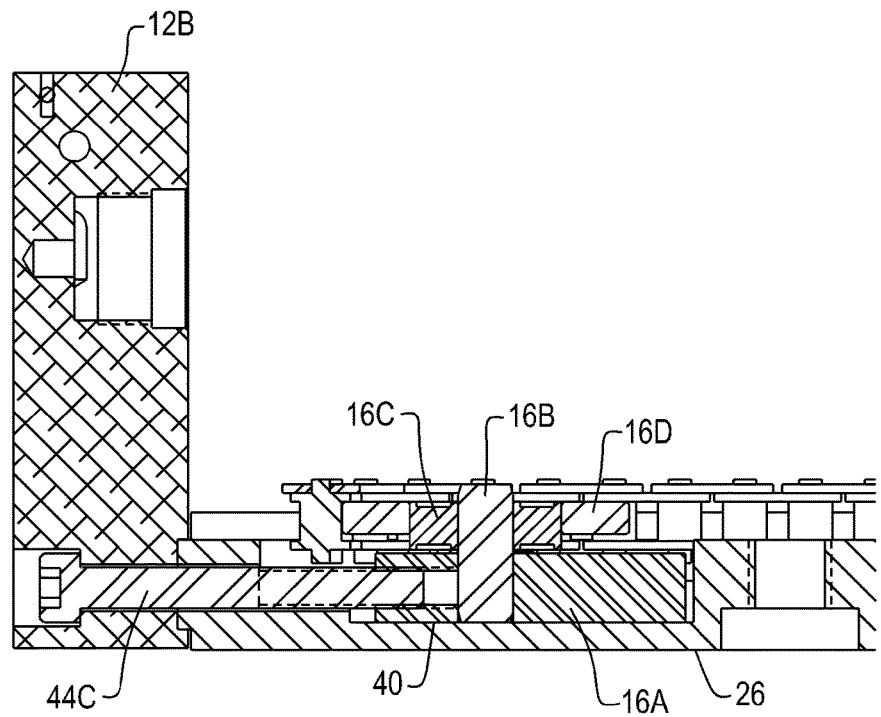
FIG. 6 is a section view showing the tension mechanism taken across line 6-6.

FIG. 6 is a cross section showing the tensioning mechanism, which tensions the chain loop 18. The tensioning mechanism includes a tensioning fastener 44C that creates tension in the chain loop 18 when it is inserted through the appropriate holes in the endplate 12B and baseplate 26, and is then subsequently threaded into hole 40 of the pulley base 16A (FIG. 6). The tightening of fastener 44C applies tension to the pulley base 16A and in turn, the pulley dowel pin 16B, the pulley bearing 16C, the pulley disc 16D, and ultimately to the chain lengths 32A and 32B. Proper pre-loading of the chain loop 18 is essential to evenly distribute the load created by the grip force throughout the chain loop 18. The tensioning mechanism is mirrored on the opposite end of the gripper 10. Tensioning the chain loop 18 from both ends ensures that the pulley assemblies 16, 16' are as close to equidistant from the center of the gripper 10 as possible. This also allows for any needed adjustment due to variations in chain length or machined parts.

Figure 7:
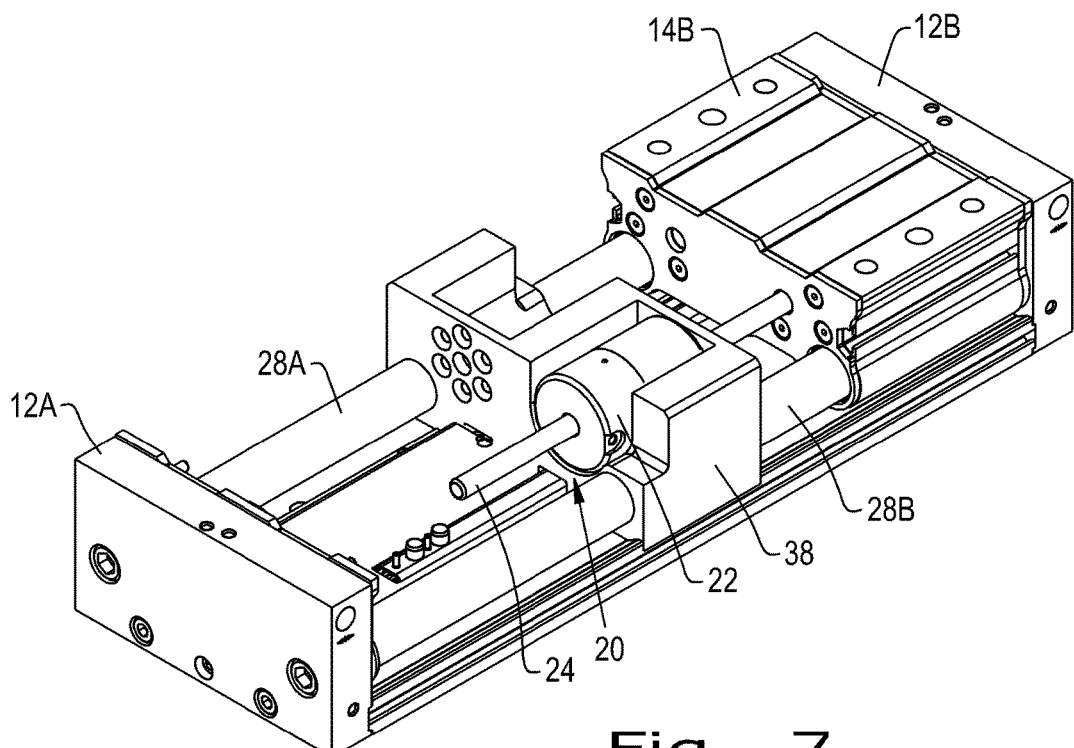
FIG. 7 is a perspective view illustrating the relationship of a brake and one of the jaws.

The brake assembly 20 includes a brake 22 and a brake rod 24 (FIG. 7). The brake 22 is attached to a corresponding recess of the center plate 38. The brake 22 is normally engaged, meaning that the brake 22 applies a clamping force to the brake rod 24 when compressed air is not supplied. The brake rod 24 is fixed to the jaw 14B and passes through the brake 22. In the event of loss of power or compressed air supply, the brake 22 applies sufficient clamping force to the brake rod 24 to prevent movement of the jaws 14A, 14B. Since the brake rod 24 is attached to only one jaw 14B, the force is transmitted through the synchronizing mechanism, i.e. the chain loop 18 and pulley assembly 16, preventing the opposite jaw 14A from moving. It is conceivable to attach the brake assembly 20 to jaw 14A initially, to both jaws 14A, 14B, or to attach two brake assemblies 20 to each jaw 14A, 14B (not shown).

Due to the environments in which the gripper 10 will be used, as well as the nature of the chain loop 18, the synchronizing mechanism must be protected from contamination. Stationary chain covers 42A can be added to protect the pulley assemblies 16, 16' and the majority of the chain loop 18 from contamination due to debris. The chain covers 42A fit tightly against endplates 12A, 12B, and are held in place using fasteners 44D that attach the chain covers 42A to the interior side of the baseplate 26. Additional smaller covers 42B are attached to the underside of jaws 14A and 14B. These smaller covers 42B protect the length of the chain loop 18 that would otherwise be exposed when the jaws 14A, 14B of the gripper 10 are moved apart.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A device for gripping an object, comprising:
   a main body having a first and a second endplate;
   a baseplate extending between the first endplate and the second endplate;
   at least one guide rail extending between the first endplate and the second endplate;
   a first jaw and a second jaw, each receiving said at least one guide rail;
   a first pulley assembly and a second pulley assembly, respectively attached to the baseplate; and
   a chain loop respectively attached to the first pulley assembly and the second pulley assembly, said chain loop including:
      a first chain length and a second chain length; and
      a first link and a second link attaching the first chain length and the second chain length, each of said first link and said second link including at least one dowel pin, the chain loop being attached to the first jaw and the second jaw by the at least one dowel pin of each of said first link and said second link.

2. The device of claim 1, wherein said first jaw and said second jaw respectively include at least one hole for receiving the respective at least one dowel pin of the first link and the second link.

3. The device of claim 1, wherein the device further includes an actuating circuit with at least one actuator connected to the main body, said first jaw and said second jaw are each driven by the at least one actuator.

4. The device of claim 1, wherein said first pulley assembly and said second pulley assembly each include a pulley base, a pulley dowel pin, a pulley bearing, and a pulley disc.

5. The device of claim 4, wherein said pulley dowel pin is pressed into the pulley base, the pulley disc is pressed over the pulley bearing, which is then, in turn, pressed onto the pulley dowel pin.

6. The device of claim 1, wherein the device further includes a center plate disposed in between said first jaw and said second jaw, and receiving said at least one guide rail.

7. The device of claim 1, wherein the device further includes at least one stationary chain cover attached to said baseplate.

8. The device of claim 1, wherein the device further includes at least one smaller cover attached to an underside of at least one of said first jaw and said second jaw.

9. A device for gripping an object, comprising:
   a main body having a first and a second endplate;
   a baseplate extending between the first endplate and the second endplate;
   at least one guide rail extending between the first endplate and the second endplate;
   a first jaw and a second jaw, each receiving said at least one guide rail; and
   a brake assembly, including:
      a brake; and
      a brake rod, wherein the brake is attached to the brake rod and the brake rod is attached to said second jaw, wherein the brake applies a clamping force to the brake rod, and upon a loss of power or compressed air, said clamping force prevents a movement of the first jaw and the second jaw.

10. The device of claim 9, wherein the device further includes an actuating circuit with at least one actuator connected to the main body, said first jaw and said second jaw are each driven by the at least one actuator.

11. The device of claim 9, wherein the device further includes a center plate disposed in between said first jaw and said second jaw, and receiving said at least one guide rail.

12. The device of claim 9, wherein the device further includes at least one stationary chain cover attached to said baseplate.

13. The device of claim 9, wherein the device further includes at least one smaller cover attached to an underside of at least one of said first jaw and said second jaw.

14. A device for gripping an object, comprising:
   a main body having a first and a second endplate;
   a baseplate extending between the first endplate and the second endplate;
   at least one guide rail extending between the first endplate and the second endplate;
   a first jaw and a second jaw, each receiving said at least one guide rail;
   a first pulley assembly and a second pulley assembly respectively attached to the baseplate;
   a chain loop respectively attached to the first pulley assembly and the second pulley assembly, said chain loop including:
      a first chain length and a second chain length; and
      a first link and a second link attaching the first chain length and the second chain length, each of said first link and said second link including at least one dowel pin, the chain loop being attached to the first jaw and the second jaw by the at least one dowel pin of each of said first link and said second link; and
   a brake assembly, including:
      a brake; and
      a brake rod, wherein the brake is attached to the brake rod and the brake rod is attached to said second jaw.

15. The device of claim 14, wherein said first jaw and said second jaw respectively include at least one hole for receiving the respective at least one dowel pin of the first link and the second link.

16. The device of claim 14, wherein the device further includes an actuating circuit with at least one actuator connected to the main body, said first jaw and said second jaw are each driven by the at least one actuator.

17. The device of claim 14, wherein said first pulley assembly and said second pulley assembly each include a pulley base, a pulley dowel pin, a pulley bearing, and a pulley disc.

18. The device of claim 17, wherein said pulley dowel pin is pressed into the pulley base, the pulley disc is pressed over the pulley bearing, which is then, in turn, pressed onto the pulley dowel pin.

19. The device of claim 14, wherein the device further includes a center plate disposed in between said first jaw and said second jaw, and receiving said at least one guide rail.

* * * * *